United States Patent [19]

Fritzsche

[11] Patent Number: 4,678,427

[45] Date of Patent: Jul. 7, 1987

[54] AUTOMATIC SHUT OFF NOZZLE FOR PLASTIC EXTRUDER

[75] Inventor: Klaus Fritzsche, Allistom, Canada

[73] Assignee: Husky Injection Molding System Ltd., Bolton, Canada

[21] Appl. No.: 794,287

[22] Filed: Nov. 4, 1985

[51] Int. Cl.[4] .............................................. B29C 45/22
[52] U.S. Cl. .................................... 425/562; 425/563; 425/565; 425/DIG. 226
[58] Field of Search .............. 425/562, 563, 564, 565, 425/567, 574, 583, DIG. 224, DIG. 226; 264/328.11

[56] References Cited

U.S. PATENT DOCUMENTS

| | | | |
|---|---|---|---|
| 3,374,502 | 3/1968 | Lazzara | 425/562 |
| 3,401,426 | 9/1968 | Evans | 425/562 |
| 3,679,341 | 7/1972 | Graybill et al. | 425/565 |
| 3,719,310 | 3/1973 | Hunten | 425/564 |
| 4,010,903 | 3/1977 | Sakuri et al. | 425/563 |
| 4,386,903 | 6/1983 | Wybenga | 425/565 |

FOREIGN PATENT DOCUMENTS 1023900  3/1966  United Kingdom ............... 425/564

*Primary Examiner*—Jay H. Woo
*Assistant Examiner*—Timothy W. Heitbrink
*Attorney, Agent, or Firm*—Bachman & LaPointe

[57] ABSTRACT

An apparatus for purging an injection molding machine utilizing a three stage or three position nozzle assembly.

11 Claims, 4 Drawing Figures

AUTOMATIC SHUT OFF NOZZLE FOR PLASTIC EXTRUDER

FIELD OF THE INVENTION

The invention relates to injection molding machines and relates in particular to a multi-position nozzle assembly to facilitate purging.

BACKGROUND OF THE INVENTION

In many prior art injection molding machines the outlet of the machine is fitted with a check valve which remains closed during plasticizing of the melt and at the appropriate time is opened by pressing the molding machine against a mold sprue bushing.

That is, the valve usually has only two positions i.e. open or closed.

When it is desired to purge the machine to observe the quality of the melt, for example, it is necessary to introduce a cumbersome, intermediate device at the outlet of the machine opening the check valve partially to allow melt to flow into a purging catchment or similar container.

The introduction of the purging unit is hazardous and difficult to perform quickly to avoid degradation of sensitive resins.

The purging unit is frequently handled manually exposing the operating to hot melt and upon removal the hazard is increased by the heat induced into the purging unit.

Representative prior art purging structures are disclosed and described in U.S. Pats. Nos. 3,374,502, 3,401,426 1 and 4,386,903.

While prior art purging units are operable it is highly desirable to simplify the purging operation to reduce operation risk, speed up the process, reduce scrap and to avoid degradation of sensitive resins.

OBJECT OF THE INVENTION

Consequently it is a principal object of the present invention to provide a multi-position nozzle assembly as a fixture to a molding machine which is operable to assume a purging position with automatic shut-off.

A further object of the invention is the provision of multi-position nozzle assembly incorporated into an injection molding machine where the assembly is operable conveniently to assume at least three positions, namely: a closed position, a purging position and a molding position.

Further features of the invention are the provision of a safe, economical automatic shut-off purging unit which frees an operator from the hazards and risks arising from dealing with hot melt and hot purging instrumentalities.

SUMMARY OF THE INVENTION

A nozzle assembly embracing certain features of the present invention and operable to assume a plurality of positions including a purging position may comprise a housing having an internal compound transmission channel, a sleeve member received slidably in said housing, a torpedo having a through bore communicating with an inlet port slidably disposed in said sleeve member and spaced axially therefrom, said inlet port being operable to connect with said transmission channel, cap means carried by said torpedo for effecting operating contact with said sleeve member, and power means operating on said torpedo and on the sleeve member tending to urge the torpedo axially relative to the sleeve member to maintain contact between said sleeve member and said cap means whereby said sleeve member overlays and closes said port to establish said closed port position while maintaining said axially spaced condition between the torpedo and the sleeve member.

BRIEF DESCRIPTION OF THE DRAWINGS

Other features and advantages of the present invention will become more apparent from an examination of the succeeding specification when read in conjunction with the appended drawings, in which.

DETAILED DESCRIPTION

Figure 1:
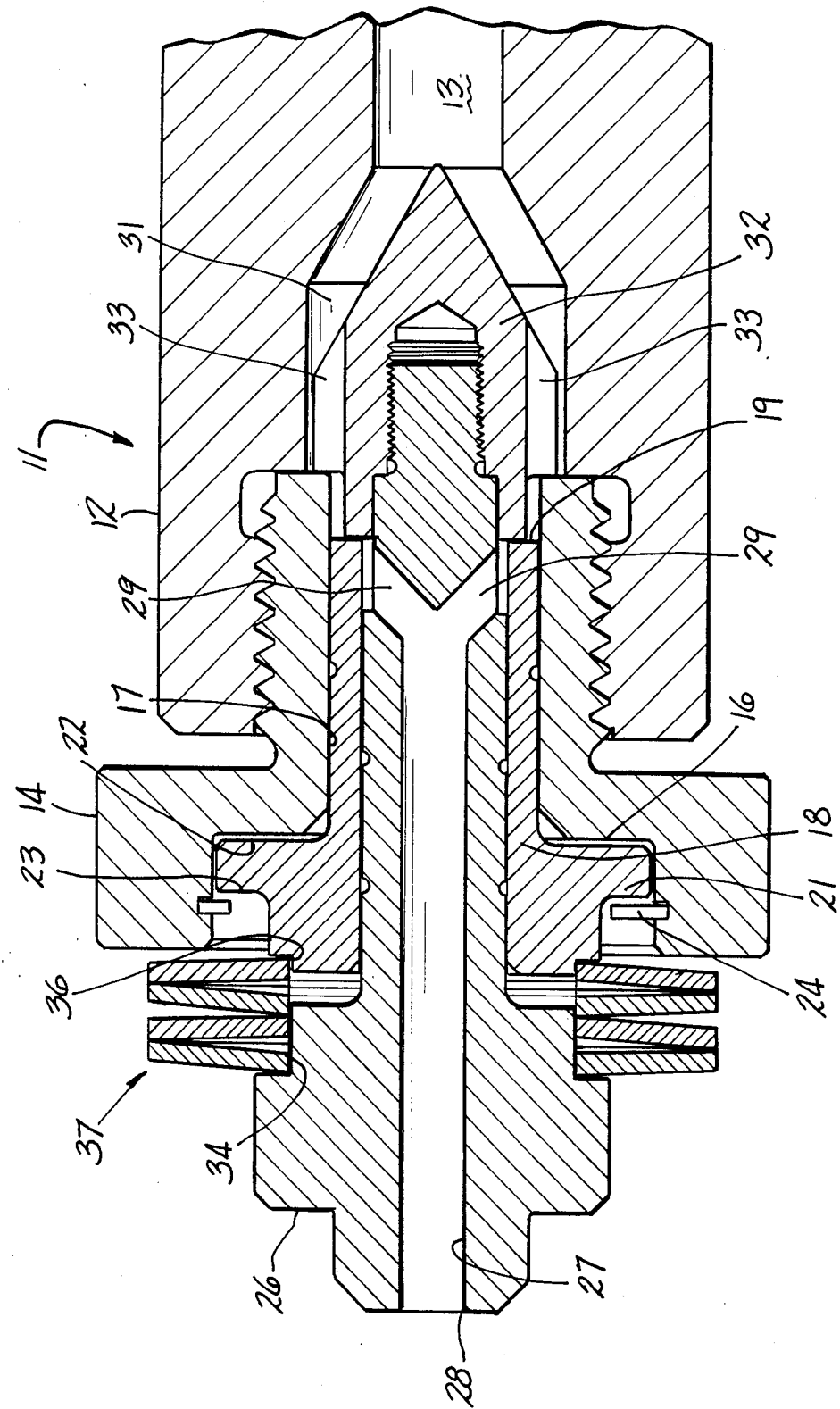
FIG. 1 is an enlarged sectional view of the nozzle assembly of the present invention.

Referring now in detail to the drawings the reference numeral 10 designates a mold sprue bushing and the reference numeral 11 designates the discharge or outlet end of an injection molding machine or an extruder in which a housing 12 having a compound transmission channel 13 is fitted with an extension 14 having a counterbore 16.

The housing extension 14, formed with a cylindrical bore 17, receives slidably a sleeve member 18 having a working face 19 and a circular flange 21 received in the counterbore 16.

One face 22 of the flange 21 is spaced axially from a mating face of the counterbore 16 by a first predetermined dimension A (FIG. 2) and the opposite face 23 of the flange is spaced axially from a retaining ring 24 by a second larger predetermined dimension B.

The sleeve member, in turn, receives slidably a torpedo 26 having a through bore 27 leading to a discharge or outlet end 28 and to a plurality of inlet ports 29-29.

The ports 29-29 are operable to communicate with compound transmission channel 13 via passage 31.

Releasably connected to the torpedo is a cap means 32 having a plurality of radially extending flutes 33-33. In the present embodiment of the invention the cap means is threadedly connected to the torpedo.

The cap means is operable to contact a portion of the working face 19 of the sleeve member 18 as is most apparent in FIG. 1.

A power means (indicated generally at 37), in the present embodiment a set of Belleville washers, is received under compressive stress between the torpedo 26 and the sleeve member 18, supported by offset abutments or shoulders 34 and 36, tending to separate the torpedo and the sleeve member axially against the restraint of the cap means 32 while maintaining snug contact between the sleeve member and the cap means at working face 19.

In the closed position of the nozzle assembly (FIGS. 1 and 2) the right end of the sleeve member overlays and closes inlet ports 29 and the torpedo 26 and the sleeve member 18 are spaced axially a third predetermined dimension C, a larger dimension than dimension B.

In addition, the power means 37 operates to hold the closed position of inlet ports 29-29 against the usual and customary forces exerted on the working face 19 of the sleeve member 18 resulting from resin plasticizing or resin transfer pressures within the injection molding machine.

When it is desired to purge the unit the pressure in the injection molding machine is increased gradually until there is sufficient force on the working face 19 of the sleeve member 18 to drive the sleeve axially along the torpedo 26 compressing power means 37 (Belleville washers in this embodiment) until the sleeve engages retaining ring 24.

Figure 3:
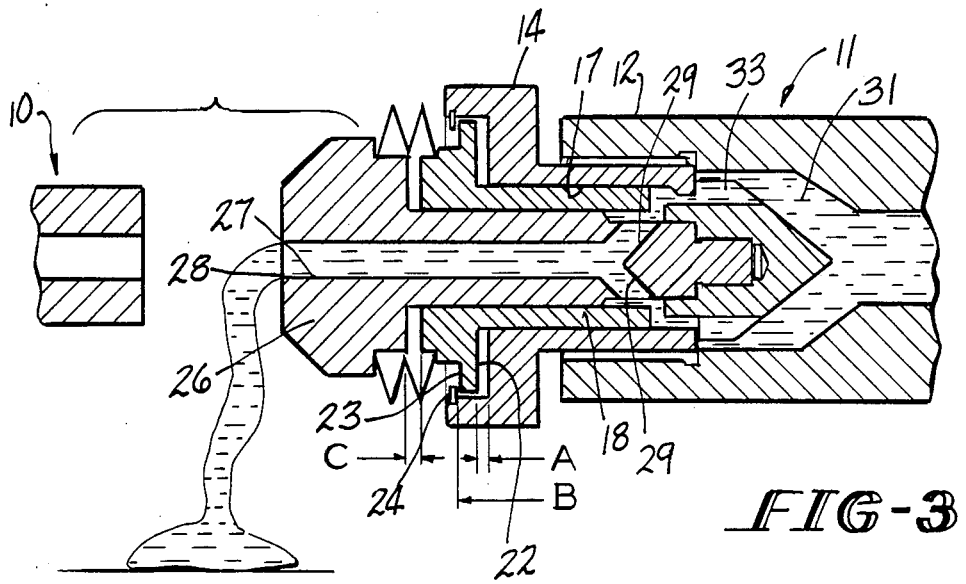
FIG. 3 is a similar view showing the purging position.

This occurrence opens inlet ports 29-29 partially and establishes the purging position of the nozzle assembly, as is most apparent in FIG. 3, allowing melt to flow from channel 13 to through bore 27 and to the atmosphere via passage 31, past flutes 33 and through partially open ports 29-29.

Note that in the purging position dimension B is eliminated and is added to dimension A.

Figure 2:
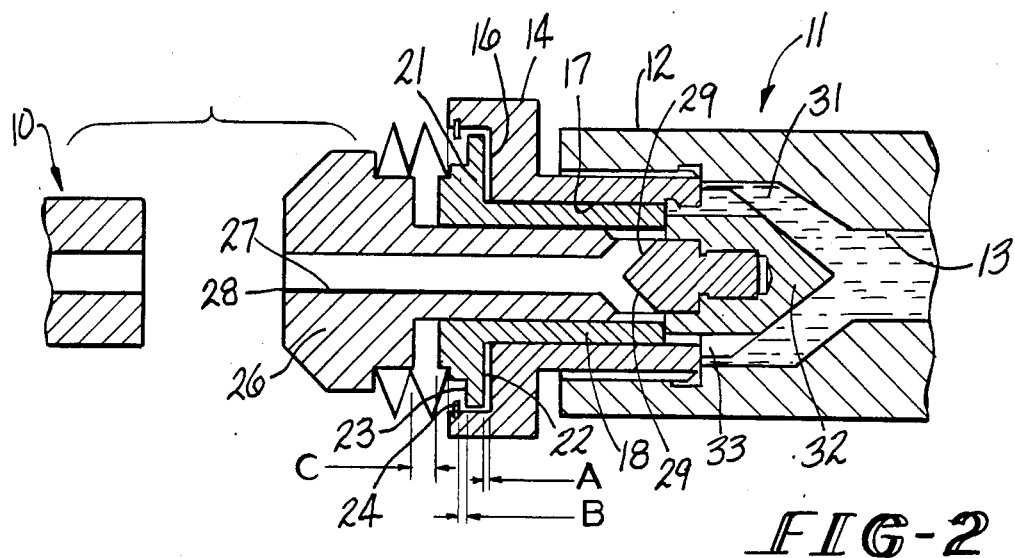
FIG. 2 is a sectional view showing the assembly in the closed position.

Reduction of pressure in the injection molding machine allows the power means to move the nozzle assembly to the position of FIGS. 1 and 2 automatically establishing the closed position thereby terminating purging flow. That is the sleeve 18 closes ports 29-29.

When it is desired to proceed with injection molding the injection molding machine as a unit is moved into contact with and pressed against an abutment such as a mold sprue bushing 10.

Figure 4:
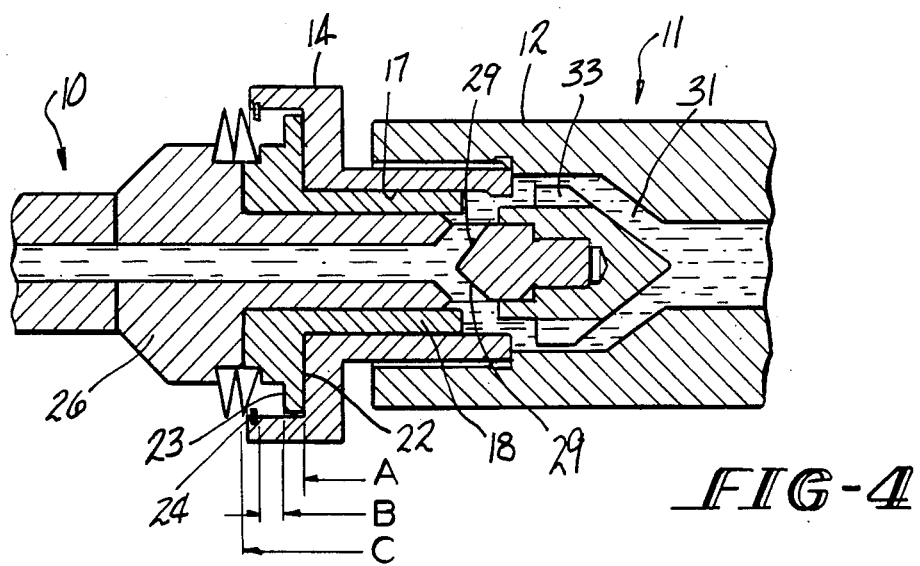
FIG. 4 shows the full open or molding position.

This step is operative to compress the power means 37, take up all the remaining axial spacing represented by dimensions A and C and thrust the torpedo to the right to establish the third position or the injection molding position as shown in FIG. 4.

In this injection molding position the ports 29-29 are fully opened allowing a flow path of minimum restriction for the injected resin.

Upon withdrawal of the nozzle assembly from the sprue bushing 10 the power means operates to establish the closed position automatically.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications which are within its spirit and scope as defined by the claims.

What is claimed is:

1. A multi-position nozzle assembly for an injection molding machine operable to assume three distinct positions, namely a fully closed position, a partially open purging position and a fully open molding position, said nozzle assembly comprising:

a housing having an internal compound transmission channel, a housing extension connected to said housing, a sleeve member received slidably in said housing extension, stop means on said housing extension for limiting relative axial motion between the sleeve member and the housing extension and for establishing the partially open purging position, a torpedo having a central through bore slidably disposed in said sleeve member, said central through bore having an inlet port and an outlet end said inlet port being operable to connect with said transmission channel, cap means carried by said torpedo for effecting operating contact with said sleeve member, and a single power means operating continuously and directly on said torpedo and on the sleeve member, said power means tending to urge the torpedo relative to the sleeve member to maintain contact between said sleeve member and said cap means whereby said sleeve member overlays and closes said inlet port to establish said fully closed position while maintaining a predetermined axially spaced condition between the torpedo and the sleeve member.

2. The nozzle assembly of claim 1 in which the cap means in combination with the housing and housing extension defines a passage for molding compound flowing from said transmission channel toward said inlet port.

3. The nozzle assembly of claim 2 in which the sleeve member is formed with a working face exposed to said passage whereby compound under pressure flowing through said passage is operative to drive said sleeve member relative to said torpedo in the same direction as that of compound flow and in opposition to said power means to open said port partially to establish said compound purging position, said working face increasing in area after initial movement thereby requiring less compound pressure to sustain the purging position than required to move the sleeve initially.

4. The nozzle assembly of claim 1 in which the housing includes a counterbore portion and the sleeve member is formed with a flange element received within said counterbored portion.

5. The nozzle assembly of claim 4 in which the counterbored portion is fitted with a retaining ring defining a stop means for limiting the extent of the axial motion of the sleeve member relative to the housing extension.

6. The nozzle assembly of claim 1 in which the single power means defines spring elements disposed between and in contact with the torpedo and the sleeve member, said spring elements being under compressive stress tending to separate the torpedo from said sleeve member.

7. The nozzle assembly of claim 6 in which the torpedo and the sleeve member are each formed with peripheral shoulders and the spring elements define Belleville washers supported by said shoulders.

8. The nozzle assembly of claim 1 in which the cap engages the torpedo releasably and is formed with radial flutes for facilitating communication between said transmission channel and said inlet port.

9. The nozzle assembly of claim 4 in which the flange element of said sleeve member is spaced axially from said housing extension a first predetermined distance when the nozzle assembly is in the closed position to insure firm contact between the sleeve and the cap.

10. The nozzle assembly of claim 5 in which the flange element is spaced axially from said retaining ring a second predetermined distance when the nozzle assembly is in the closed position said second predetermined distance being a measure of the extent of movement of said sleeve in said partially open purging condition.

11. The nozzle assembly of claim 1 in which the torpedo is spaced axially from said sleeve member a third predetermined distance when the nozzle assembly is in the closed position said third predetermined distance being a measure of axial advance of said torpedo in establishing said fully open position.

* * * * *